(12) United States Patent
 Cantwell et al.

(10) Patent No.: US 10,932,440 B2
(45) Date of Patent: Mar. 2, 2021

(54) ANIMAL CRATE ASSEMBLY

(71) Applicant: Mid-West Metal Products Company, Inc., Muncie, IN (US)

(72) Inventors: Brad Cantwell, Muncie, IN (US); Stew Kerr, Muncie, IN (US); David J. Nolley, Muncie, IN (US); Michael E. Greene, Muncie, IN (US)

(73) Assignee: MID-WEST METAL PRODUCTS COMPANY, INC., Muncie, IN (US)

( * ) Notice: Subject to any disclaimer, the term of this patent is extended or adjusted under 35 U.S.C. 154(b) by 0 days.

(21) Appl. No.: 16/888,958

(22) Filed: Jun. 1, 2020

(65) Prior Publication Data

US 2020/0288667 A1    Sep. 17, 2020

Related U.S. Application Data

(63) Continuation-in-part of application No. 15/915,351, filed on Mar. 8, 2018, now Pat. No. 10,743,514.

(51) Int. Cl.
 *A01K 1/03* (2006.01)

(52) U.S. Cl.
 CPC .................................. *A01K 1/033* (2013.01)

(58) Field of Classification Search
 CPC ...... A01K 1/003; A01K 1/032; A01K 1/0245; A01K 1/034; A01K 31/06; A01K 31/002; A01K 31/10; A01K 1/03; F16B 2/248; E05B 65/0007; E05C 3/02; E05C 3/006; E06B 11/021
 USPC ........................................................ 119/481
 See application file for complete search history.

(56) References Cited

U.S. PATENT DOCUMENTS

| 3,499,674 | A | 3/1970 | Burkholder |
| 5,373,810 | A | 12/1994 | Martin |
| 5,456,208 | A | 10/1995 | Choenchom |
| 6,230,655 | B1 | 5/2001 | Cohen |
| 6,681,720 | B1 | 1/2004 | Skurdalsvold et al. |
| 7,918,188 | B1 * | 4/2011 | Harper ................. A01K 1/0245 |
| | | | 119/481 |
| 10,378,255 | B2 | 8/2019 | McDaid |
| 2010/0200580 | A1 | 8/2010 | Cheng-Lung |
| 2016/0024824 | A1 | 1/2016 | Link |
| 2017/0000080 | A1 | 1/2017 | Bin |
| 2017/0055489 | A1 | 3/2017 | Bin |
| 2017/0071149 | A1 * | 3/2017 | Northrop ............... A01K 1/034 |

* cited by examiner

*Primary Examiner* — Magdalena Topolski
*Assistant Examiner* — William L Gmoser
(74) *Attorney, Agent, or Firm* — Taft Stettinius & Hollister LLP; Stephen F. Rost

(57) ABSTRACT

A crate assembly includes a plurality of members defining an interior of the crate assembly, where the plurality of members includes a front, a back, a top, a bottom, a first side and a second side. A frame is formed in one of the plurality of members, the frame having a plurality of interconnected horizontal and vertical wires that define a door opening. A door is pivotally coupled to the frame about a pivot wire of the frame to move between an open position and a closed position. A latch assembly is pivotally coupled to a horizontal wire of the frame. The latch assembly includes a wire having a first end, a second end and a transverse portion, the wire forming a first portion defined between the first end and the transverse portion and a second portion defined between the second end and the transverse portion.

20 Claims, 12 Drawing Sheets

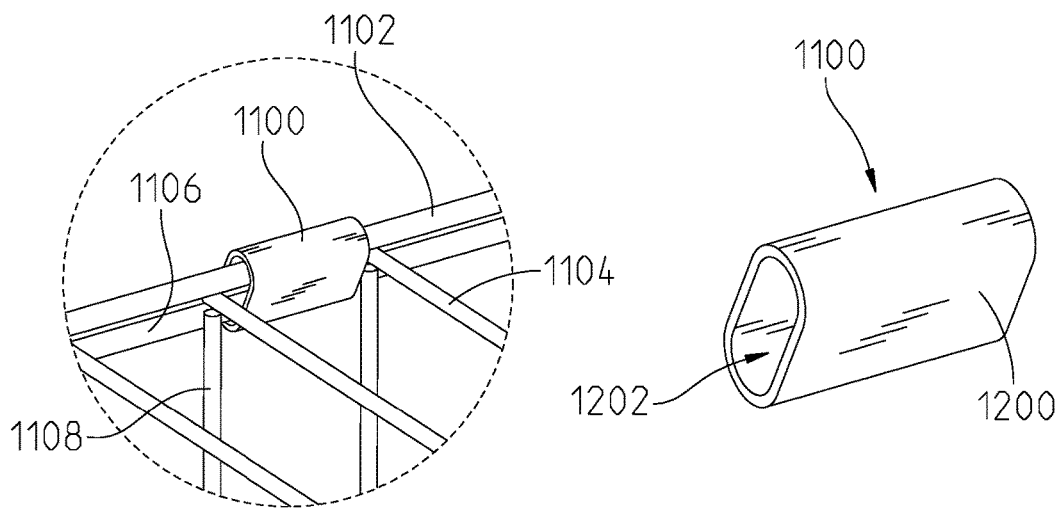
Fig. 11
Fig. 12
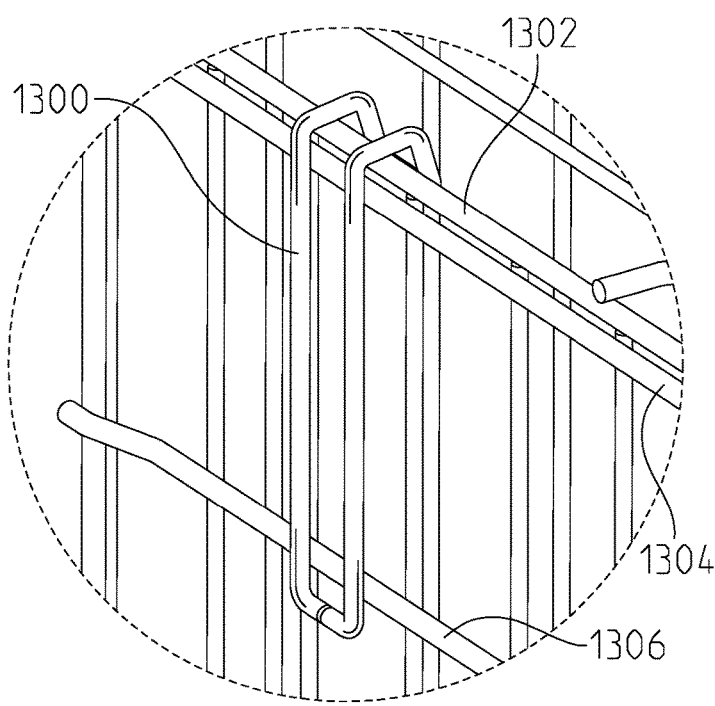
Fig. 13
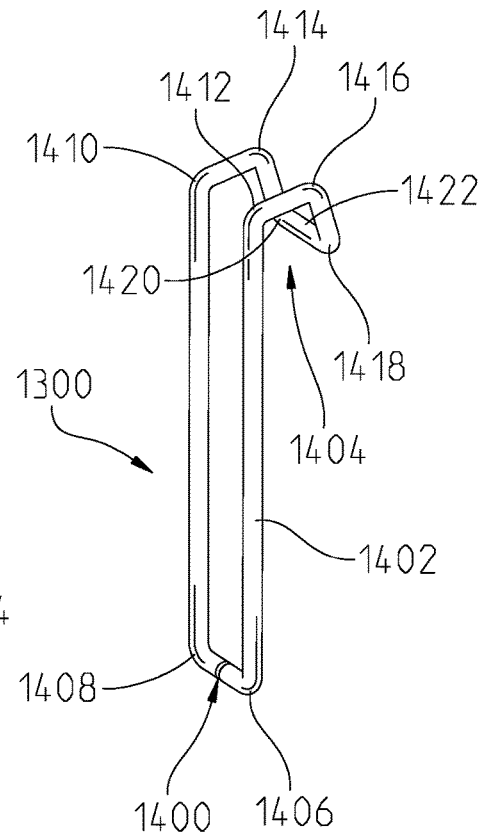
Fig. 14

ANIMAL CRATE ASSEMBLY

RELATED APPLICATIONS

This application is a continuation-in-part of U.S. patent application Ser. No. 15/915,351, filed Mar. 8, 2018, the disclosure of which is hereby incorporated by reference in its entirety.

FIELD OF THE DISCLOSURE

The present disclosure relates to an animal crate assembly, and, in particular, to an animal crate assembly having a latching mechanism and shelf assembly.

BACKGROUND

The use of animal cages or crates is well known. Many conventional cages have been developed over the years for housing animals of different shapes, sizes, and types. For example, animal cages typically house pets such as dogs and cats. Rabbits, rodents and other small animals have also been known to be housed by such cages and are quite common. Other conventional cages are used for farm animals when needed, including ducks and chickens. As cages have been further developed, the portability, safety, and ease of use have become points of emphasis. Some conventional cages, for example, have been designed to collapse to a compact structure for portability. Others have been designed to be of light weight and from durable materials. Conventional cages have been designed for ease of transporting an animal. Some conventional cages are designed as exercise pens that provide an interior space that the animal can move about, particularly outdoors.

Most conventional cages include at least one door for providing access to the interior of the cage. The animal enters or exits the cage through an opening when the door is opened, and the animal can be safely contained in the cage when the door is closed. Many conventional cages include a door that is latched or locked in its closed position with a latch, such as a slide bolt latch. A variety of latches have been incorporated into the design of the door to allow a user to open, close, and or securely latch the door.

Many of these conventional designs have limitations, however. With regards to an exercise pen, for example, the door is generally formed by an entire height and width of a panel or side member of the pen. Many of these doors are not able to be securely latched or may not prevent an animal from escaping the crate assembly. In addition, due to the size of the door, it can be difficult for an owner to reach into the interior of the exercise pen and retrieve a desired animal when two or more animals are enclosed therein.

In other conventional cages, the wire gauge used to manufacture the cage lacks robustness. In these instances, a caged animal may push or force different panels away from one another. In other instances, the caged animal may damage the cage or, even worse, injure themselves.

Therefore, a need exists for an improved animal crate assembly that provides better means for accessing the interior of the crate assembly and increasing the safety of an animal when contained within the interior.

SUMMARY

In one embodiment of the present disclosure, an animal crate assembly includes a plurality of members defining an interior of the crate assembly, where the plurality of members includes a front, a back, a top, a bottom, a first side and a second side; a door frame formed in one of the plurality of members, the door frame having a plurality of interconnected horizontal and vertical wires that define an opening for an animal to pass therethrough and to enter or exit the interior of the crate assembly; a door comprising a plurality of interconnected horizontal and vertical wires and being pivotally coupled to the door frame, the door being pivotable about a pivot wire of the frame to move between an open position and a closed position; and a hook member formed from a wire having a first end, a second end, and a hook portion, the hook member being coupled to the top and the hook portion extending partially downward where it intersects a plane in which the top is disposed within; wherein, each of the plurality of members is formed by a plurality interconnected horizontal and vertical wires; wherein, the top and door frame are coupled to one another; further wherein, the hook portion is positioned between a top perimeter wire of the top and a frame perimeter wire of the door frame such that the hook portion is located within the interior of the crate assembly and behind the door frame.

In one example of this embodiment, the top comprises a first wire positioned parallel to the top perimeter wire, the hook member being coupled to the first wire and the top perimeter wire. In a second example, a cross wire has a length shorter than the first wire and the top perimeter wire but being parallel therewith, the hook member being coupled to the cross wire. In a third example, the top comprises a first wire and a second wire, the first and second wires being parallel to but offset from one another, where the first and second wires are perpendicular to the top perimeter wire. In a fourth example, the hook member is positioned between the first and second wires. In a fifth example, a cross wire is coupled to the first wire, the second wire and the hook member.

In a sixth example, the hook member comprises a first bend and a second bend, where a first portion of the hook member is defined between the first end and the first bend and the second end and the second bend, and the hook portion is defined between the first and second bends. In a seventh example, the first portion is defined within a first plane and the hook portion is defined in a second plane. In an eighth example, the first plane and second plane are perpendicular to one another.

In a ninth example, a plurality of elongate hooks may couple the top and door frame to one another, where each of the plurality of elongate hooks comprises a wire having a first end and a second end, the second end defining a hook opening for receiving the top perimeter wire of the top and the frame perimeter wire of the door frame. In a tenth example, at least one side clip is formed by a wire having a first end, a second end, and a receiving end, the receiving end coupling a second top perimeter wire of the top with the first side or the second side. In an eleventh example, a clip has a hollow body with a defined opening, the clip coupling one of the plurality of members with another of the plurality of members.

In another embodiment of the present disclosure, a multi-level animal crate assembly includes a plurality of members defining an interior of the crate assembly, the plurality of members includes a front, a back, a top, a bottom, a first side and a second side, wherein each of the plurality of members comprises a plurality of horizontal and vertical interconnected wires; an upper level and a lower level formed by the front, the back, the top, the bottom, the first side and the second side, where the upper level is located above the lower level; a first door frame formed in one of the plurality of members, the first door frame comprising a plurality of interconnected horizontal and vertical wires that define an opening for an animal to pass therethrough and to enter or exit the interior at the upper level of the crate assembly; a first door comprising a plurality of interconnected horizontal and vertical wires and being pivotally coupled to the first door frame, the first door being pivotable about a pivot wire of the first door frame to move between an open position and a closed position; a second door frame formed in one of the plurality of members, the second door frame comprising a plurality of interconnected horizontal and vertical wires that define an opening for an animal to pass therethrough and to enter or exit the interior at the lower level of the crate assembly; a second door comprising a plurality of interconnected horizontal and vertical wires and being pivotally coupled to the second door frame, the second door being pivotable about a pivot wire of the second door frame to move between an open position and a closed position; and a hook member formed from a wire having a first end, a second end, and a hook portion, the hook member being coupled to the top such that the hook portion extends partially downward where it intersects a plane in which the top is disposed within; wherein, the top and first door frame are coupled to one another, the top including a top perimeter wire and the first door frame including a frame perimeter wire; further wherein, the hook portion is positioned between the top perimeter wire and the frame perimeter wire such that the hook portion is located at least partially within the interior of the crate assembly and behind the door frame.

In one example of this embodiment, the top comprises a first wire and a cross wire, the first wire and cross wire being positioned parallel to the top perimeter wire such that the hook member is coupled to the first wire, the cross wire and the top perimeter wire. In a second example, the cross wire comprises a length shorter than the first wire and the top perimeter wire. In a third example, the top comprises a second wire and a third wire, the second and third wires being parallel to but offset from one another; the first and second wires are perpendicular to the top perimeter wire, the first wire and the cross wire; and the hook member is positioned between the first and second wires and parallel thereto.

In a fourth example, the hook member comprises a first bend and a second bend, where a first portion of the hook member is defined between the first end and the first bend and the second end and the second bend, and the hook portion is defined between the first and second bends. In a fifth example, the first portion is defined within a first plane and the hook portion is defined in a second plane, the first plane and second plane being perpendicular to one another.

In a further embodiment of the present disclosure, an animal crate assembly includes a plurality of members defining an interior of the crate assembly, where the plurality of members includes a front, a back, a top, a bottom, a first side and a second side; a door frame formed in one of the plurality of members, the door frame having a plurality of interconnected horizontal and vertical wires that define an opening for an animal to pass therethrough and to enter or exit the interior of the crate assembly; a door comprising a plurality of interconnected horizontal and vertical wires and being pivotally coupled to the door frame, the door being pivotable about a pivot wire of the door frame to move between an open position and a closed position; a hook member formed from a wire having a first end, a second end, and a hook portion, the hook member being coupled to the top and the hook portion extending partially downward where it intersects a plane in which the top is disposed within; a plurality of elongate hooks for coupling the top and door frame to one another, where each of the plurality of elongate hooks comprises a wire having a first end and a second end, the second end defining a hook opening for receiving the top perimeter wire of the top and the frame perimeter wire of the door frame; at least one side clip formed by a wire having a first end, a second end, and a receiving end, the receiving end coupling a second top perimeter wire of the top with the first side or the second side; and a clip having a hollow body with a defined opening, the clip coupling one of the plurality of members with another of the plurality of members; wherein, the hook portion is positioned between a top perimeter wire of the top and a frame perimeter wire of the door frame such that the hook portion is located within the interior of the crate assembly and behind the door frame.

In one example of this embodiment, the hook member comprises a first bend and a second bend, where a first portion of the hook member is defined between the first end and the first bend and the second end and the second bend, and the hook portion is defined between the first and second bends; and the first portion is defined within a first plane and the hook portion is defined in a second plane, the first plane and second plane being perpendicular to one another.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 11 is an enlarged perspective view of a clip located on the crate assembly of FIG. 9;

FIG. 12 is a perspective view of the clip of FIG. 11;

FIG. 13 is an enlarged perspective view of another clip located on the crate assembly of FIG. 9;

FIG. 14 is a perspective view of the clip of FIG. 13;

Corresponding reference numerals are used to indicate corresponding parts throughout the several views.

DETAILED DESCRIPTION

The embodiments of the present disclosure described herein are not intended to be exhaustive or to limit the disclosure to the precise forms disclosed in the following detailed description. Rather, the embodiments are chosen and described so that others skilled in the art appreciate and understand the principles and practices of the present disclosure.

The present disclosure relates to an animal crate assembly. The animal crate assembly can be used for multiple purposes, such as to contain one or more animals or objects. The crate assembly can be made of any size for accommodating an animal or object of any size. In addition, the crate assembly can be made of different materials including aluminum, plastic, and steel. The crate assembly can be designed as an animal cage to define an interior that is surrounded at all sides, or it can be designed as an exercise pen in which at least one side is not present, for instance a top side.

Figure 1:
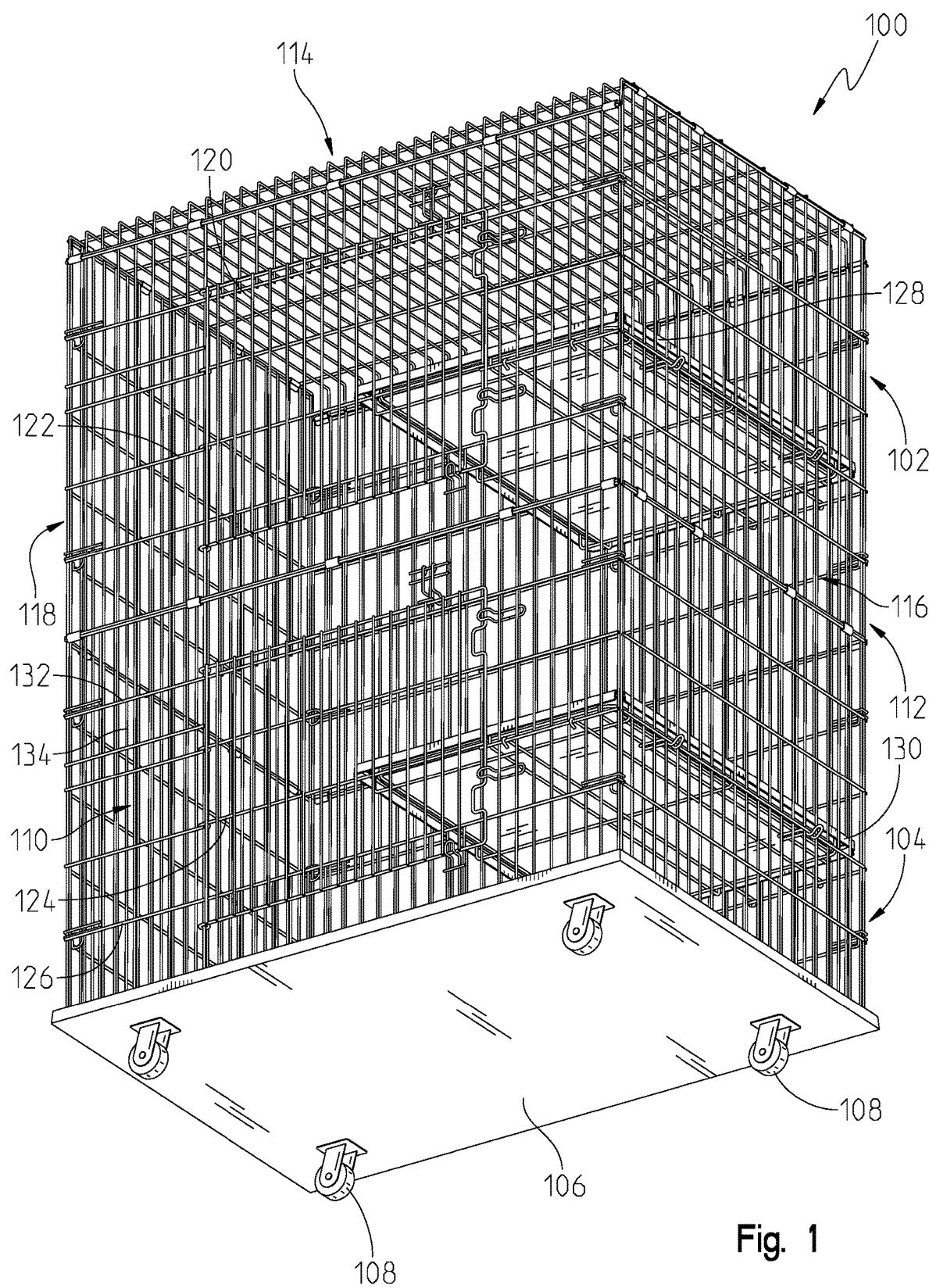
FIG. 1 is a bottom perspective view of a multi-tier animal crate assembly.
Figure 2:
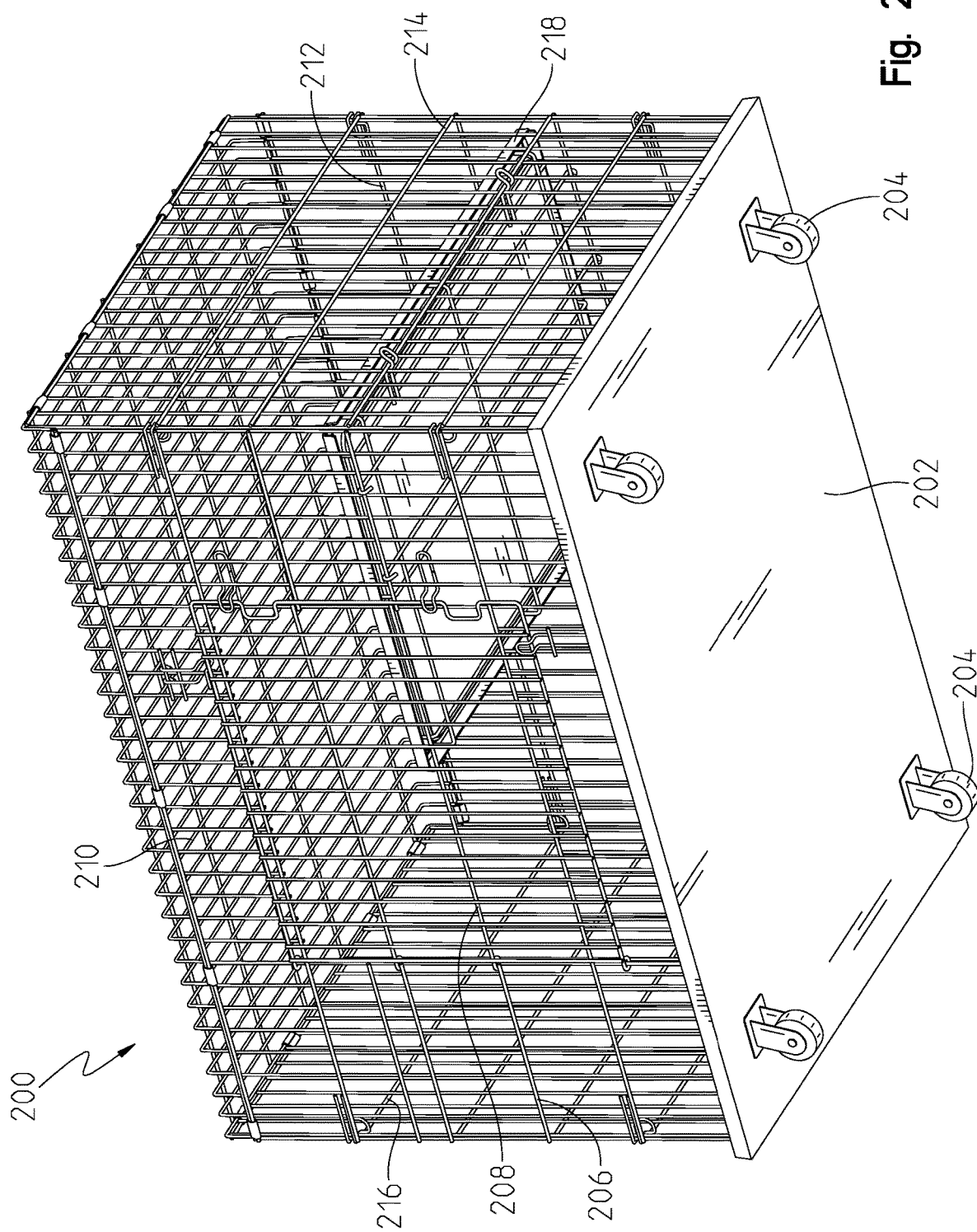
FIG. 2 is a bottom perspective view of a single tier animal crate assembly.

Referring to FIG. 1, an exemplary embodiment of an animal crate assembly 100 is shown. The crate assembly 100 is in the form of a multi-tiered crate assembly, but this is only intended to be one such embodiment. In FIG. 2, which will be described below, another crate assembly is shown as a single tier assembly.

In any event, the crate assembly 100 can be formed by a plurality of substantially horizontal and vertical wires that overlap one another to define an interior having a defined length, width and height to accommodate an animal. One or more of the horizontal wires 132 can be coupled to one or more of the vertical wires 134, and vice versa, to add structural integrity to the crate assembly 100. In other embodiments, wires are oriented in other directions than horizontal and vertical. The wires may be welded, adhered, fastened, or coupled to one another through a variety of means. The crate assembly 100 can include a plurality of sides or members that form the crate assembly 100.

In FIG. 1, for example, the crate assembly 100 includes an upper level 102 and a lower level 104. The upper level 102 and lower level 104 may be similar. In some cases, there may be a panel disposed inbetween the levels to allow for partial separation therebetween. In other cases, such as the embodiment of FIG. 1, there may not be any separating panel. The entire crate assembly 100 may be supported by a support frame 106. The support frame 106 may include one or more caster wheels 108 coupled to the bottom thereof to allow the crate assembly 100 to be portable.

The crate assembly 100 may include a front 110, a back 112, a top 114, a first side 116, and a second side 118. The interior of the crate assembly 100 therefore is defined by the front 110, back 112, top 114, first side 116, second side 118, and support frame 106. The upper level 102 may include the top 114, whereas the lower level 104 may not include a top or bottom as it rests or is coupled to the support frame 106.

The upper level 102 may be provided with a top door 120 and top door frame 122 formed in the front 110 thereof. The top door 120 may be disposable between a closed position (FIG. 1) and an open position (not shown). As will be described, the top door 120 may be latched or otherwise disposed in its closed position in such a way that an animal is unable to open the top door 120. This will be described below.

Similar to the upper level 102, the lower level 104 may also include a bottom door 124 and a bottom door frame 126. The bottom door 124 and bottom door frame 126 are formed in the front 110 as shown in FIG. 1. It is understood, however, that the top and bottom doors and door frames may be formed in any one of the front, back, first side and second side. Moreover, it may be possible to incorporate a single door in the top 114. The doors and door frames may be formed in the same side, such as the front 110 in FIG. 1, but this too is not required. In other embodiments, one of the two doors and door frames may be formed in the front 110, and the other of the two doors and door frames may be formed in the back. In combination thereof is possible, and the illustrated embodiment of FIG. 1 is only intended to be one representation of possibilities with the crate assembly 100 described in the present disclosure.

In FIG. 1, the crate assembly 100 may also include a pair of shelves. Here, a first shelf assembly 128 may be disposed in the upper level 102 of the crate assembly 100, and a second shelf assembly 130 may be disposed in the lower level 104. Each shelf assembly may be securely coupled to the crate assembly 100 to allow an animal to climb or move between levels. The manner in which the shelf assembly is coupled to the crate assembly will be described in further detail below.

Referring now to FIG. 2, a different embodiment of a crate assembly 200 is illustrated. Here, the crate assembly 200 is a single-tier assembly, but it includes many of the same features and design as the crate assembly 100 of FIG. 1. For instance, the crate assembly 200 includes a support frame 202 that may include one or more caster wheels 204 coupled thereto. The caster wheels 204 may freely roll along a ground surface to allow the crate assembly 200 to be portable.

In addition, the crate assembly 200 may include a door frame 206 formed on at least one side thereof. A door 208 may be coupled to the door frame 206, such that the door 208 may be configured between a closed position (FIG. 2) and an open position. When the door 208 is in its open position, a door opening is defined by the door frame 206 to allow an animal to enter or exit an interior of the crate assembly 200.

As described, the door frame 206 and door 208 may be provided on any side of the crate assembly 200. In FIG. 2, the crate assembly 200 includes a top 210, a front (same side as door frame 206 and door 208), a back 212, a first side 214, and a second side 216. The different sides may be formed by a plurality of interconnecting horizontal and vertical wires. A shelf assembly 218 may also be disposed in the interior of the crate assembly 200 and coupled to the door frame 206, the first side 214, and the back 212, as will be described below.

The embodiment of FIGS. 1 and 2 introduce different types of crate assemblies. Other embodiments may depart from the embodiments of FIGS. 1 and 2 and include any number of levels. In some cases, additional levels may be incorporated to the back or sides of the crate assembly such that a respective assembly has a greater length or width.

Figure 3:
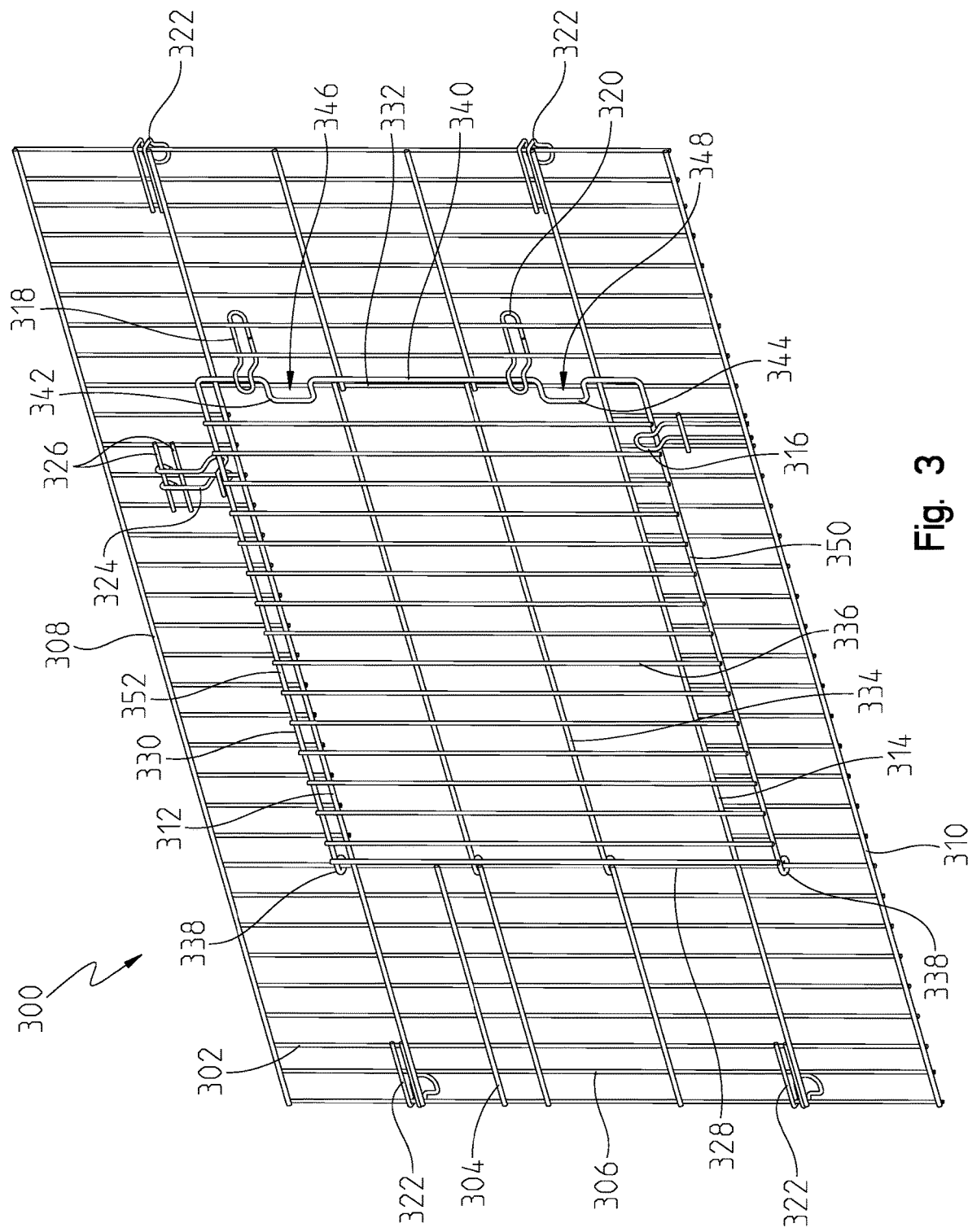
FIG. 3 is a perspective view of a door frame and door assembly of FIG. 2 with a latch in a rest position and the door in the closed position.

Turning to FIG. 3, one embodiment of a door assembly 300 that may be incorporated into the crate assemblies of FIGS. 1 and 2 is shown. The door assembly 300 includes a door frame 302 and a door 330. The door frame 302 may be coupled to one or more sides of an animal crate assembly via one or more wire clips 322. For example, in FIG. 2, the door frame 302 may be similar or the same as the door frame 206, and it may couple via the wire clips 322 to the first side 214 and the second side 216.

The door assembly 300 may be formed by a plurality of interconnecting horizontal wires 304 and vertical wires 306. The plurality of horizontal and vertical wires may be spaced such that an animal is unable to get a paw or other body part caught or stuck between the wires.

In FIG. 3, the door frame 302 may include a top frame wire 308 at its uppermost horizontal wire 306, and a bottom frame wire 310 as its lowermost horizontal wire 306. The door frame 302 also defines a door opening, which is covered in FIG. 3 by the door 330 in its closed position. The door opening is defined by a first horizontal frame wire 312 of the door frame 302, a second horizontal frame wire 314, a vertical pivot wire 328, and a first vertical wire 332. The first horizontal frame wire 312 defines an uppermost boundary of the door opening, whereas the second horizontal frame wire 314 defines a lowermost boundary of the door opening. The vertical pivot wire 328 defines one side boundary and the first vertical wire 332 defines a second side boundary of the door opening. The dimensions of the door opening may be sized to allow different size animals to travel in or out of the crate assembly.

The door 330 may be pivotally coupled to the door frame 302 via the vertical pivot wire 328. For instance, the door 330 may also be formed by a plurality of interconnecting horizontal wires 334 and vertical wires 336. Each of the plurality of horizontal door wires 334 includes a curled end 338 which curls or bends around the vertical pivot wire 328 to allow the door 330 to pivot relative to the door frame 302. The curled ends 338 securely fasten the door 330 to the pivot wire 328 to allow the door 330 to freely pivot thereabout, but it further allows the door 330 to slide vertically along the vertical pivot wire 328. Thus, the vertical and pivotal movement of the door 330 relative to the door frame 302 allows the door 330 to move between its open and closed positions.

As described above and shown in FIG. 3, the door 330 is formed by a plurality of interconnecting horizontal and vertical wires. In particular, the door 330 may include an outer door wire 340. The outer door wire 340 is formed by a single wire, and it forms a door top wire 352 and a door bottom wire 350. The door top wire 352 is the uppermost horizontal wire of the door 330, and the door bottom wire 350 is the lowermost horizontal wire of the door 330. Moreover, the outer door wire 340 includes a vertical wire portion as well. The vertical portion of the outer door wire 340 is formed at the opposite end of the door opening from the vertical pivot wire 328. As shown in FIG. 3, the vertical portion of the outer door wire 340 may form one or more tab openings, which the function of will be described below. The one or more tab openings may be defined by a first wire portion 342 and a second wire portion 344 in the embodiment of FIG. 3. Here, the first wire portion 342 and second wire portion 344 bend inwardly toward the door opening. Each portion forms a pair of horizontal portions and a single vertical portion such that both the first and second wire portions form a C-shaped structure. The C-shaped structure of the first wire portion 342 and the second wire portion 344 therefore define a first tab opening 346 and a second tab opening 348, respectively.

The door frame 302 may include one or more upright tabs 316 coupled to it. The upright tab 316 may extend upward beyond the door bottom wire 350 when the door 330 is in the closed position. This provides enhanced security to the door 330, and can prevent an animal from moving the door 330 while contained within the interior of the crate assembly. Moreover, the upright tab 316 provides additional robustness to the overall crate assembly.

The door assembly 300 in FIG. 3 may also include a latch 324. The latch 324 may be pivotally coupled to a pair of horizontal wires 326 affixed to the door frame 302. The pair of wires 326 may include shorter lengths compared to the other horizontal frame wires 304 that makeup the door frame 302. For example, in the illustrated embodiment, the pair of horizontal wires 326 may span the gap between three of the plurality of vertical frame wires 306 of the door frame 302.

Figure 7:
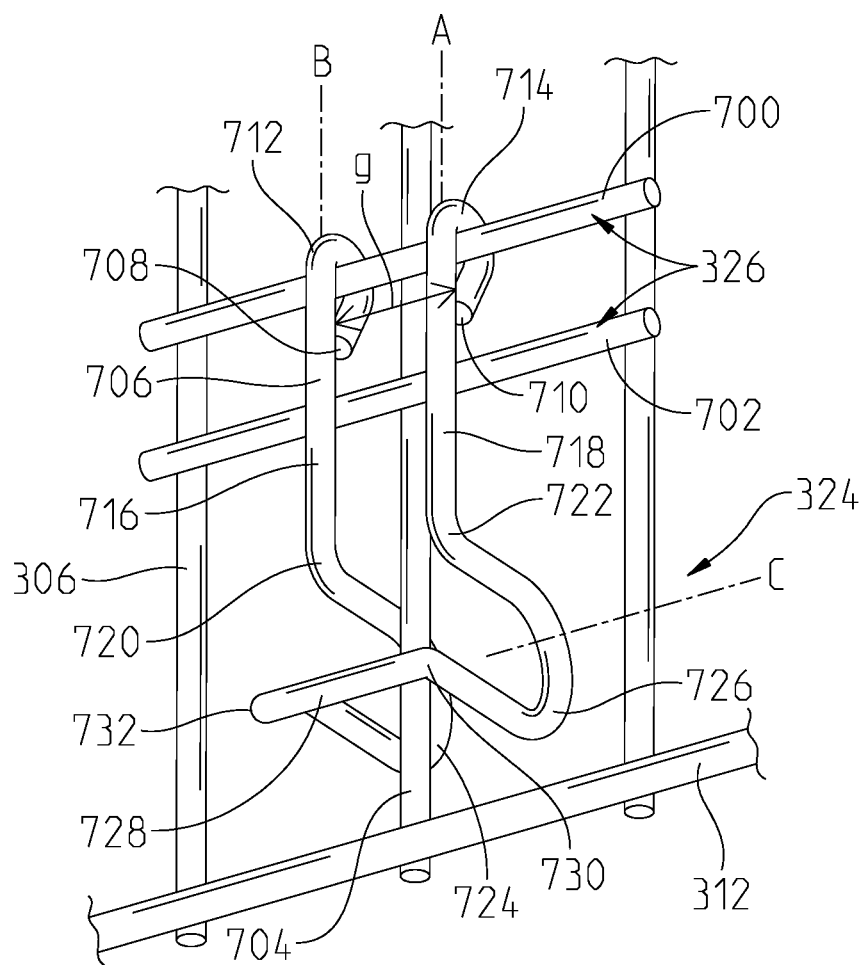
FIG. 7 is a perspective view of the latch of FIG. 3 in its rest position.

The latch 324 and pair of horizontal wires 326 are shown in greater detail in FIG. 7. In FIG. 7, for example, the pair of horizontal wires 326 includes a first horizontal wire 700 and a second horizontal wire 702. Both of the horizontal wires 700, 702 may be coupled to the three vertical wires 306 as shown. The coupling may be via a welding, adhesive, or other known means. The three vertical wires are spaced approximately equidistantly from one another, as is the case with the other vertical wires 306 that form the door frame 302. A middle vertical wire 704 is therefore spaced approximately equidistantly between the two outer vertical wires in FIG. 7.

The latch 324 may be formed by a single latch wire 706, although in other embodiments it may also be possible for two or more wires to be connected to one another to form the latch 324. In FIG. 7, the latch wire 706 comprises a first end 708 and a second end 710. The first end 708 and second end 710 may be pivotally coupled to the first horizontal wire 700 as shown. Moreover, the latch wire 706 may slide horizontally along the first horizontal wire 700 in some instances. The latch wire 706 includes a first curled portion 712 and a second curled portion 714 that wrap generally around the first horizontal wire 700. The first end 708 may be disposed in close proximity to or in contact with a first elongate portion 716 of the latch wire 706, thereby maintaining the pivotal connection with the first horizontal wire 700. Likewise, the second end 710 may be disposed in close proximity to or in contact with a second elongate portion 718 thereby maintaining the pivotal connection with the first horizontal wire 700.

The first elongate portion 716 is disposed between the first curled portion 712 and a first bend 720 in the latch wire 706. Likewise, the second elongate portion 718 is disposed between the second curled portion 714 and a second bend 722. A first curve portion 724 of the wire 706 curls in a C-shaped form from the first bend 720 to a first transverse bend 732. Moreover, a second curve portion 726 of the latch wire 706 curls in a C-shaped form from the second bend 722 to a second transverse bend 730. The latch wire 706 forms a transverse portion 728 between the first transverse bend 732 and the second transverse bend 730.

The structural design of the latch 324 is such that the first end 708, the first curled portion 712, the first elongate portion 716, the first bend 720, the first curve portion 724, and the first transverse bend 732 may lie within a first plane, B. In addition, the second end 710, the second curled portion 714, the second elongate portion 718, the second bend 722, the second curve portion 726, and the second transverse bend 730 may lie within a second plane, A. Moreover, the transverse portion 728 of the latch wire 706 may lie in a horizontal plane, C. In this embodiment, the first plane B and second plane A may be offset from and parallel to one another. As such, the first plane B and second lane A may be perpendicular to the third plane C.

Although not labelled in FIG. 7, the middle vertical wire 704 of the door frame 302 may be disposed along a substantially vertical axis. The vertical axis, and thus the middle vertical wire 704, may be disposed at a location between the first plane B and second plane A, and may further be perpendicular to the third plane C.

The latch 324 may be designed such that its weight causes the latch 324 to hang from the first horizontal wire 700. Due to gravity, the first elongate portion 716 and second elongate portion 718 of the latch wire 706 may contact in a rest position against the second horizontal wire 702. Further, the transverse portion 728 may rest against the vertical wire 704.

As shown in FIG. 3, the latch 324 may hang due its weight in a position such that the top door wire 352 is located below the first and second curve portions of the latch wire 706 when the door 330 is in its closed position. Thus, in the closed position, the door 330 may not be lifted to slide along the vertical pivot wire 328 due to interference between the latch 324 and the top door wire 352. To lift the door 330, the latch 324 must first be pivoted about the first horizontal wire 700 to provide clearance between the latch 324 and the door 330. This is shown in FIG. 4 and will be described in detail below.

Figure 4:
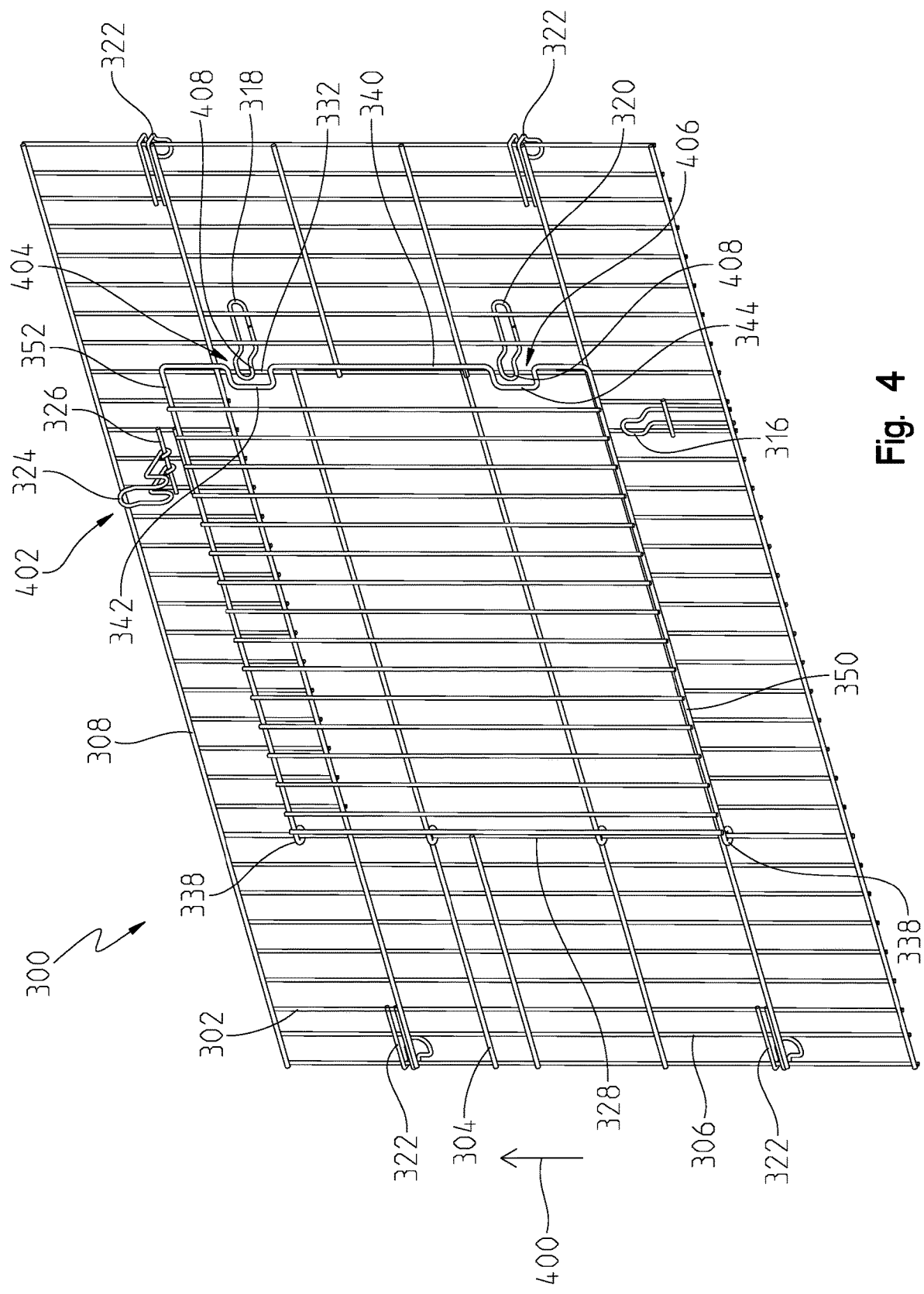
FIG. 4 is a perspective view of the door frame and door assembly of FIG. 2 with the latch in a pivoted position and the door in a partially closed position.

The manner in which the door 330 is moved from its closed position to its open position is further illustrated in FIGS. 3 and 4. The door frame 302 may include a plurality of side tabs for securely maintaining the door 330 in its closed position. In FIG. 3, a first side tab 318 and a second side tab 320 are shown. These side tabs are disposed in a horizontal orientation and affixed to one or more vertical wires 306 of the door frame 302. In the closed position, the door 330 is positioned such that a portion of the door 330 overlaps the door frame 302 and is located behind the first and second side tabs 318, 320. In particular, the outer door wire 340 of the door 330 is located between the door frame 302 and the first and second side tabs 318, 320.

When opening the door 330, the latch 324 may first be pivoted upward about the first horizontal wire 700 to a pivot position 402 as shown in FIG. 4. Once the latch 324 is moved out of the way, the door 330 may be raised in an upward direction indicated by arrow 400 in FIG. 4. As described above, the door 330 includes an outer door wire 340 that is oriented in a substantially vertical direction along the majority of its length. However, as also described above, there are two offset wire portions 342, 344 that form tab openings 346, 348, respectively. These tab openings 346, 348 are sized appropriately to allow the door 330 to pivot about the vertical pivot wire 328 once the first side tab 318 is aligned with the first tab opening 346 and the second side tab 320 is aligned with the second tab opening 348. This is shown in FIG. 4 where the first side tab 318 is in an unlatched position 404 and the second side tab 320 is in an unlatched position 406. In particular, the first side tab 318 and the second side tab 320 comprise a tab end portion 408 that may be formed by a curvature in a single wire forming each tab. The tab end portion 408 may extend horizontally past the first vertical wire 332 of the door frame 302 that forms a side boundary of the door opening. As the door 330 is pivoted about the vertical pivot wire 328, the tab end portion 408 may pass through the first tab opening 346 and the second tab opening 348, thereby allowing the door 330 to pivot with respect to the door frame 302.

As described with respect to FIGS. 1 and 2, each of the illustrated crate assemblies included at least one shelf assembly. It is to be understood, however, that the present disclosure is not limited to only those crate assemblies that have a shelf assembly. With that said, in FIGS. 5 and 6, an example of one embodiment of a shelf assembly 500 that may be implemented in a crate assembly is shown. Here, the shelf assembly 500 may be similar to the top shelf 128 and bottom shelf 130 of FIG. 1 and/or the shelf 218 of FIG. 2.

The shelf assembly 500 is shown being coupled to a crate assembly having a door frame 526 similar to the door frame 302 of FIG. 3. This is shown including the upright tab 316 and second side tab 320 as described above. It is to be understood however that any crate assembly may be used, and that reference to the door frame 302 of FIG. 3 is only intended to be one such example.

The shelf assembly 500 is illustrated as including a front end 502, a rear end 504, a first side end 506 and a second side end 508. Due to the orientation of the view of FIG. 5, a top end 510 is not clearly visible, but a bottom surface 600 is shown.

Figure 5:
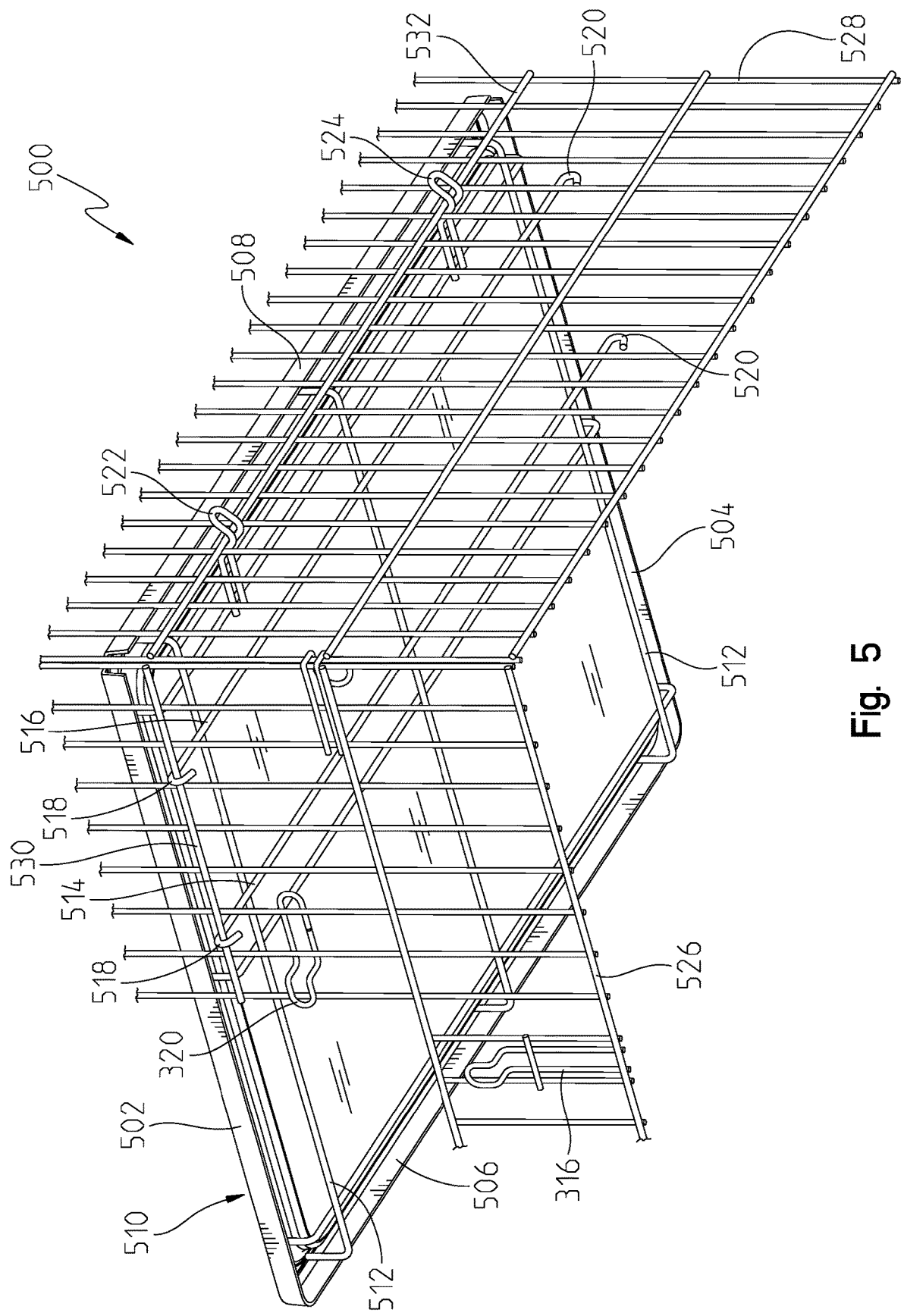
FIG. 5 is a bottom perspective view of a shelf assembly of the crate assembly of FIG. 2.
Figure 6:
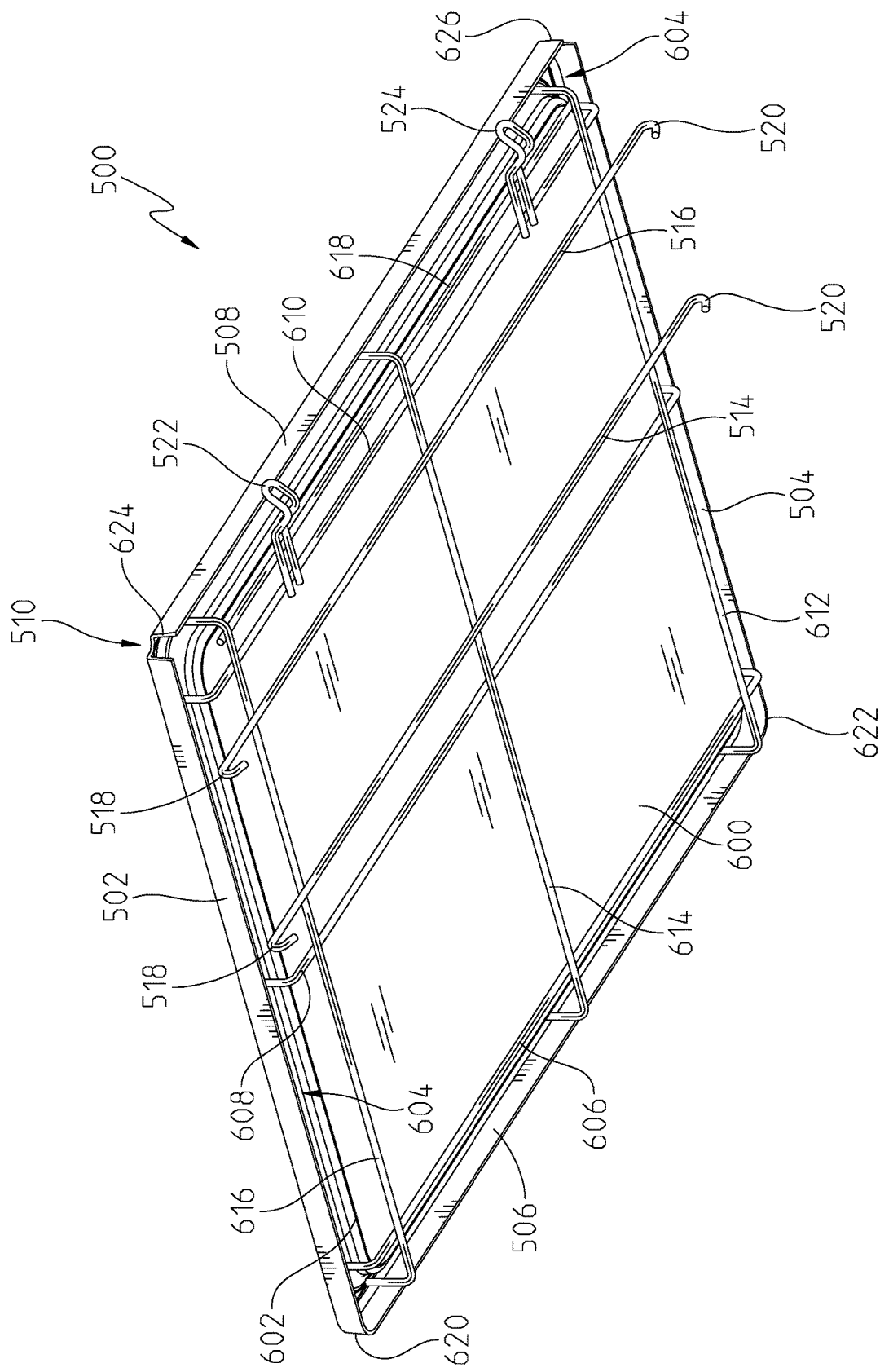
FIG. 6 is a bottom perspective view of the shelf assembly of FIG. 5 with portions of the crate assembly removed.

The shelf assembly 500 may include a wire frame 512 as shown in FIGS. 5 and 6. The shelf wire frame 512 is shown in greater detail in FIG. 6 in which it may include a first wire 606, a second wire 608, a third wire 610, and a seventh wire 618 oriented in the same direction but offset from one another. The frame 512 may also include a fourth wire 612, a fifth wire 614, and a sixth wire 616 oriented in the same direction but offset from one another. The first, second, third and seventh wires may be perpendicular to the fourth, fifth, and sixth wires, as shown in FIG. 6. The wires may overlap or interconnect with one another to form the shelf wire frame 512.

The shelf assembly 500 may be substantially rectangularly or square shaped. Other shaped designs may be used for the shelf. For purposes of FIGS. 5 and 6, however, the front end 502 and first side end 506 may converge at a first corner 620. Here, the material that forms the shelf is close-ended. The front end 502 and second side end 508 may converge at a third corner 624. As shown, the third corner 624 of the shelf assembly 500 is at least partially open-ended, i.e., there is a gap defined between portions of the front end 502 and second side end 508.

The back end 504 of the shelf assembly 500 may converge with the first side end 506 at a second corner 622 as shown in FIG. 6. Like the first corner 620, the second corner 622 may be formed as close-ended. The close-ended corners may be smooth and curved such that an animal may not get injured or caught by the respective corner. Thus, the close-ended corners may be disposed within the crate assembly facing the interior of the crate rather than a side panel 528 of the crate assembly. The back end 504 and the second side end 508 may converge at a fourth corner 626 that is formed as partially open-ended. Again, as shown in FIG. 5, the third corner 624 and fourth corner 626 may be disposed proximal to the side panel 528, whereas the first and second corners 620, 622 are disposed distal from the side panel 528.

The shelf assembly 500 may be designed such that the top end 510 is mostly smooth so as to not injure an animal positioned thereon. To incorporate the shelf frame 512, however, the front end 502, back end 504, first side end 506, and second side end 508 may defined a recess 604 between each respective end and an edge 602 of the bottom surface 600. This is shown in FIG. 6. In other words, the top end 510 of the shelf assembly may form a small cavity such that the front end 502, back end 504, first side end 506, and second side end 508 form side walls defining a cavity on the top end 510 of the shelf assembly 500. The shelf assembly 500 thus forms a concave structure on the top end. This, however, is not required in all embodiments. In other embodiments, a top surface of the shelf assembly 500 may be flush with the front end 502, back end 504, first side end 506, and second side end 508.

On the bottom side of the shelf assembly 500, however, the shelf wire frame 512 is able to fit within the recess 604 defined about the perimeter edge 602 of the bottom surface 600. The frame 512 may be welded, adhered, or mechanically coupled to the shelf body, or the body may simply rest within the shelf wire frame 512.

Figure 8:
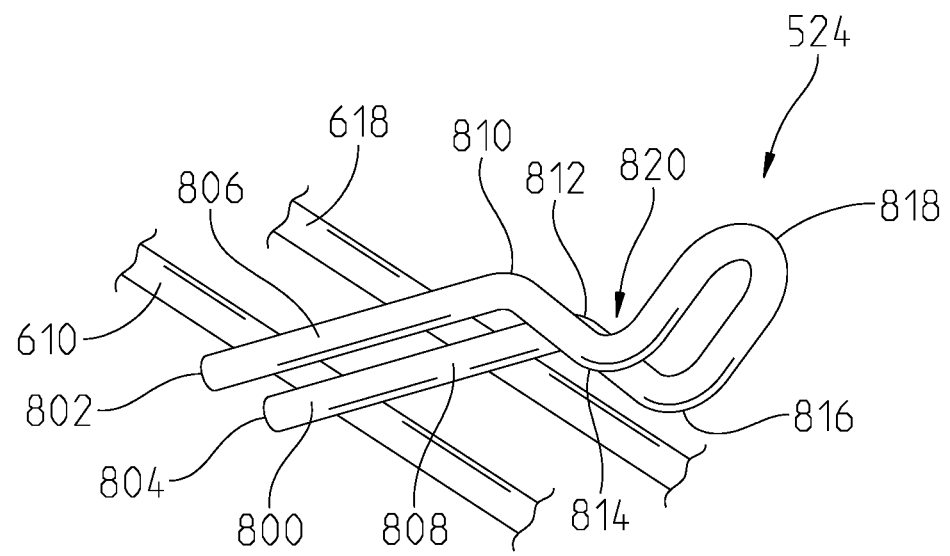
FIG. 8 is a perspective view of a shelf hook of the shelf assembly of FIG. 5.

As for coupling the shelf assembly 500 to the crate assembly, this is shown in FIGS. 5, 6 and 8. The shelf assembly 500 may include a first elongate wire 514 and a second elongate wire 516 which extend the length of the shelf assembly 500. The first and second elongate wires 514, 516 may be substantially parallel to one another but offset. Each of the elongate wires may be parallel to the first wire 606, second wire 608, third wire 610 and seventh wire 618. Moreover, the first and second elongate wires 514, 516 may be coupled to the fourth wire 612, fifth wire 614, and sixth wire 616.

The first and second elongate wires include a first hook end 518 and a second hook end 520. As shown in FIG. 5, the first hook ends 518 of the first and second elongate wires may be coupled to a door frame horizontal wire 530. Although not shown, the second hook ends 520 of the first and second elongate wires 514, 516 may be coupled to a horizontal wire located on a panel opposite the door frame 526 of the crate assembly. Thus, through the connection of the hook ends to the door frame and opposite panel, the shelf assembly 500 may be coupled to the crate assembly.

The shelf assembly 500 may also include one or more shelf hooks. In FIG. 5, for example, one embodiment is illustrated in which the shelf assembly 500 includes a first shelf hook 522 and a second shelf hook 524. The shelf hooks may comprise a single wire that is coupled to the third wire 610 and seventh wire 618 of the shelf wire frame 512.

An example of the first shelf hook 522 and the second shelf hook 524 is depicted in FIG. 8. Here, the shelf hook may be formed by a single shelf hook wire 800. In other embodiments, two or more wires may be coupled to one another to form the shelf hook. In FIG. 8, however, the shelf hook wire 800 may include a first end 802 and a second end 804. The wire 800 may be continuous from the first end 802 to the second end 804. The shelf hook wire 800 may include a first elongate portion 806 that extends from the first end 802 and a second elongate portion 808 that extends from the second end 804. The first and second elongate portions 806, 808 may be coupled to the third wire 610 and seventh wire 618 of the shelf wire frame 512 as shown in FIG. 8.

The shelf hook wire 800 may include a plurality of bends between its respective elongate portions and a curved portion 818 located opposite the first and second ends 802, 804. In particular, the first elongate portion 806 extends from the first end 802 to a first bend 810, and the second elongate portion 808 extends from the second end 804 to a second bend 812. The wire 800 continues from the first bend 810 to a third bend 814, and from the second bend 812 to a fourth bend 814. The shelf hook wire 800 further extends from the third bend 814 and fourth bend 816 to converge at the curved portion 818 as shown in FIG. 8. The shape of the shelf hook wire 800 forms a substantially V-shape between the first bend 810, third bend 814, and curved portion 818, and likewise between the second bend 812, the fourth bend 816, and the curved portion 818.

The substantially V-shaped design of the shelf hook opposite the first and second ends thereof may be used for securing the shelf assembly 500 to the side panel 528. For example, and as shown in FIG. 5, the side panel 528 is formed by a plurality of horizontal wires (and vertical wires) including a side panel horizontal wire 532. This side panel horizontal wire 532 may be disposed within a V-shaped catch portion 820 defined by the shelf wire 800. In particular, the side panel horizontal wire 532 may be in contact with each of the first and second shelf hooks 522, 524 when the shelf assembly 500 is coupled to the door frame 526 and side panel 528.

The shelf hooks 522, 524 allow for the shelf to be securely coupled to at least three different panels that form the crate assembly. Moreover, it provides additional safety to an animal that may be positioned on the shelf. Without the first and second shelf hooks, an animal may apply pressure (i.e., by laying or standing) to the first end 506 of the shelf assembly 500. In doing so, the shelf assembly 500 may be inclined to tilt in that direction, and particularly since there is no resistance or coupling to the side panel. In the present embodiment of FIG. 5, however, the first and second shelf hooks 522, 524 generally couple the shelf assembly 500 to the side panel 528 to prevent the shelf from tilting under these circumstances.

The unique design of the shelf hooks also provides additional sturdiness to the crate assembly. In some instances, an animal may push outwardly against the side panel 528 when disposed on the shelf assembly 500. Without the shelf hooks, the side panel 528 may be pushed away from the shelf assembly 500, and thereby creating a gap or space therebetween. If the animal loses its balance, for example, it may fall or have a paw or other body part become caught in this space. An injury may result to the animal. The shelf hooks, however, can securely couple the shelf assembly 500 to the side panel 528 such that if an animal does push outwardly against the side panel 528, the shelf hooks resist the side panel pulling away from the shelf assembly 500 and forming any gap or space therebetween. Thus, possible injury to the animal can be avoided under these circumstances.

Depending upon the size of the crate assembly, it may be desirable to include more than two shelf hooks. The present disclosure is intended to cover any shelf assembly having one or more shelf hooks for coupling to a panel of the shelf assembly. Moreover, as shown in FIGS. 5 and 6, the shelf hooks may be coupled to the shelf wire frame along the same side of the shelf assembly that comprises the open-ended corners. With this design, the shelf assembly may be coupled to either side panel of the crate assembly, with the closed-ended corners of the shelf being oriented towards the interior of the crate assembly.

Figure 9:
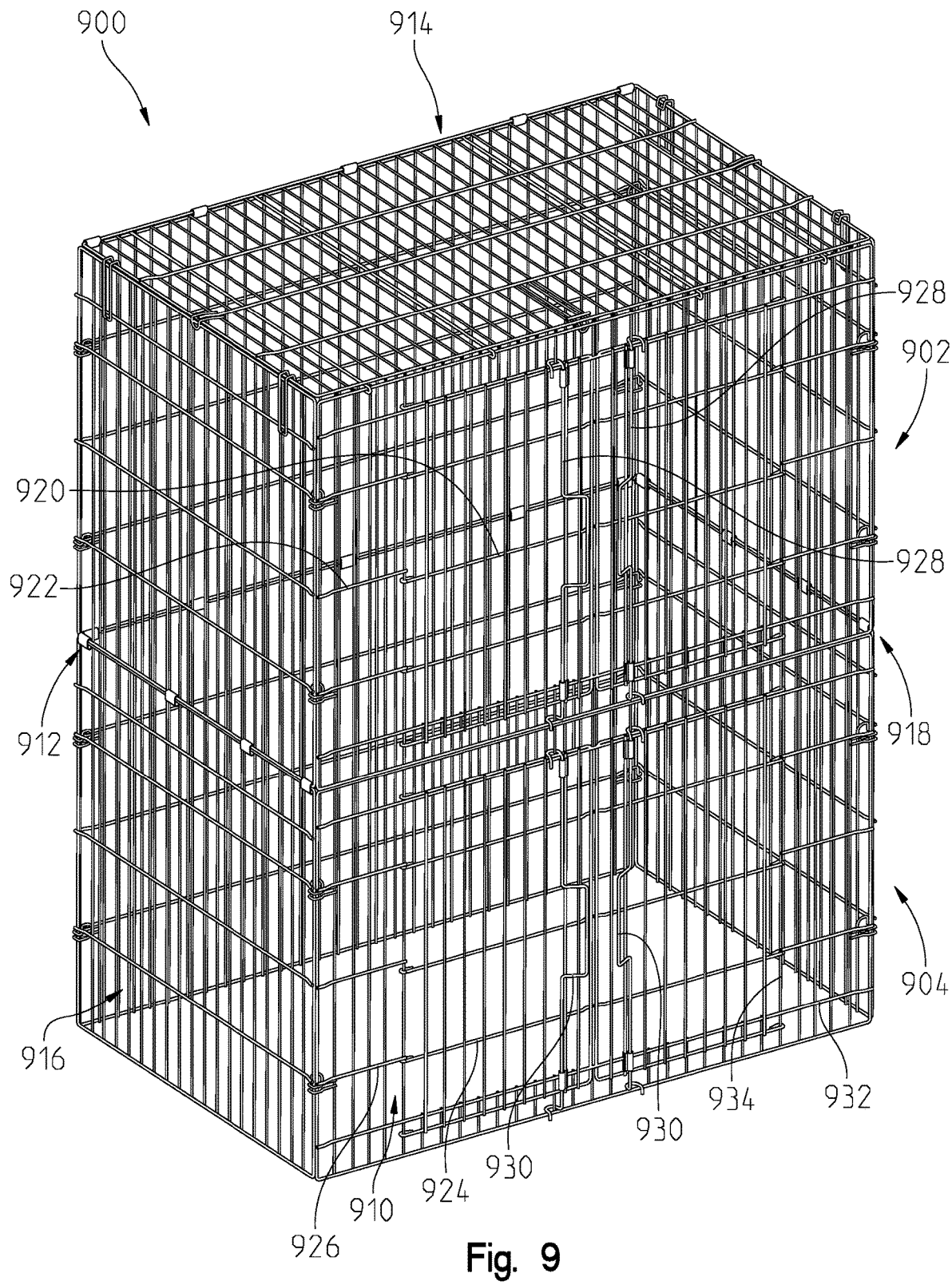
FIG. 9 is a perspective view of another crate assembly.

In FIG. 9, another embodiment of an animal crate assembly 900 is shown. The crate assembly 900 is shown in the form of a multi-tiered crate assembly, but this is only intended to be one such embodiment. However, the principles and teachings of this application extend beyond a multi-tiered crate assembly and equally apply to a single level crate assembly.

In any event, the crate assembly 900 can be formed by a plurality of substantially horizontal and vertical wires that overlap and/or interconnect with one another to define an interior having a defined length, width and height to accommodate an animal. One or more of the horizontal wires 932 can be coupled to one or more of the vertical wires 934, and vice versa, to add structural integrity to the crate assembly 900. In other embodiments, wires may be oriented in other directions than horizontal and vertical. The wires may be welded, adhered, fastened, or coupled to one another through a variety of means. The crate assembly 900 can include a plurality of sides or members that form the crate assembly 900.

In FIG. 9, for example, the crate assembly 900 includes an upper level 902 and a lower level 904. The upper level 902 and lower level 904 may be similar. In some cases, there may be a panel disposed inbetween the levels to allow for partial separation therebetween. In other cases, such as the embodiment of FIG. 1, there may not be any separating panel. The entire crate assembly 900 may be supported by a support frame, which is not shown in FIG. 9 (see FIG. 1 for an example of a support frame 106). The support frame may include one or more caster wheels coupled to the bottom thereof to allow the crate assembly 900 to be portable.

The crate assembly 900 may include a front 910, a back 912, a top 914, a first side 916, and a second side 918. The interior of the crate assembly 900 therefore is defined by the front 910, back 912, top 914, first side 916, second side 918, and support frame (if provided). If no support frame is provided, a ground surface or other bottom surface may help define the interior of the crate assembly 900. The upper level 902 may include the top 914, whereas the lower level 904 may not include a top or bottom as it rests or is coupled to the support frame.

Figure 10:
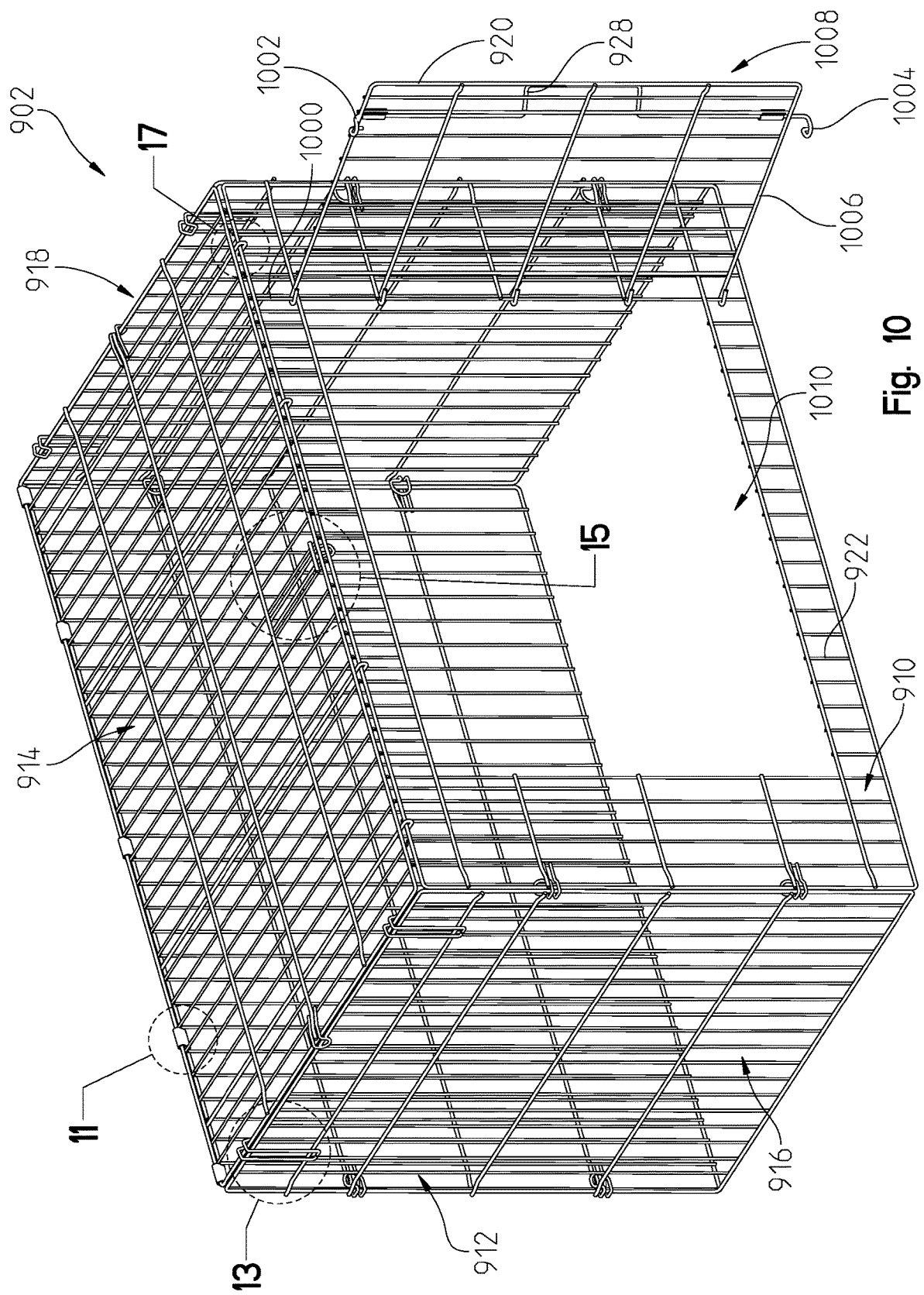
FIG. 10 is a perspective view of a top portion of the crate assembly of FIG. 9.

The upper level 902 may be provided with a top door 920 and top door frame 922 formed in the front 910 thereof. The top door 920 may be disposable between a closed position (FIG. 1) and an open position (FIG. 10). As will be described, the top door 920 may include a latch 928 for latching or securing the door 920 in its closed position in such a way that an animal is unable to open the top door 920. This will be described below.

Similar to the upper level 902, the lower level 904 may also include a bottom door 924 and a bottom door frame 926. The bottom door 924 and bottom door frame 926 are formed in the front 910 as shown in FIG. 9. A second latch 930 may be used for securing the door 924 in a closed position, as shown in FIG. 9. It is understood, however, that the top and bottom doors and door frames may be formed in any one of the front, back, first side and second side. Moreover, it may be possible to incorporate a single door in the top 914. The doors and door frames may be formed in the same side, such as the front 910 in FIG. 9, but this too is not required. In other embodiments, one of the two doors and door frames may be formed in the front 910, and the other of the two doors and door frames may be formed in the back. Any combination thereof is possible, and the illustrated embodiment of FIG. 9 is only intended to be one representation of possibilities with the crate assembly 900 described in the present disclosure.

In FIG. 9, the crate assembly 900 may also include one or more shelves (not shown) similar to what is depicted in FIG. 1. Each shelf assembly may be securely coupled to the crate assembly 900 to allow an animal to climb or move between levels. The manner in which the shelf assembly is coupled to the crate assembly is described above.

Referring now to FIG. 10, only the top portion 902 of the crate assembly 900 is shown. In some embodiments, the top portion 902 may form a single level crate assembly 900 and thus the principles and teachings related thereto apply to any crate assembly having one or more levels or tiers. Here, the top door 920 is shown with only one door rather than two individual doors. The second door is left off to better illustrate the features of the crate assembly 900. Each door 920, however, may be pivotally coupled to the door frame 922. The door frame 922 may form an internal perimeter via a pair of horizontal wires and a pair of vertical wires which define a door opening 1010. Each vertical wire that forms the perimeter of the door opening 1010 is a pivot wire 1000. In this manner, each door 920 may include one or more horizontal wires 1006 which are wrapped around and pivotally coupled to the respective pivot wire 1000 to allow the door 920 to pivot between its closed position and an open position 1008.

Each door 920 may also include a first connector 1002 and a second connector 1004. The first connector 1002 and second connector 1004 may be formed from the same wire, where the first connector 1002 is located at a top end of the door 920 and the second connector 1004 is located at a bottom end thereof. The first connector 1002 may couple to a vertical wire of the door frame 922 when the door 920 is in its closed position. Likewise, the second connector 1004 may couple to another vertical wire of the door frame 922 in the closed position.

Referring to FIGS. 10-12, the crate assembly 900 may include one or more clips 1100 as shown. In FIG. 11, the clip 1100 is shown coupling a first wire 1102 of the top 914 with a horizontal wire 1106 of the back 912. The top 914 may be formed by a plurality of wires which interconnect with one another such as the first wire 1102 and a second wire 1104. The two wires may interconnect in such a way that both are substantially perpendicular to one another. Similarly, the back 912 may include a plurality of interconnecting horizontal and vertical wires such as the horizontal wire 1106 and vertical wire 1108 shown in FIG. 11.

The clip 1100 may include an outer body 1200 which is substantially hollow and defines an opening 1202 on both ends thereof. The opening 1202 may be oval or circularly-shaped. Other designs or shapes are also possible. The clip 1100 may be formed of a sheet of metal such that it is folded or clamped to hold two different sides of the crate assembly together.

In FIG. 9, the top 914 and back 912 may be coupled to one another via two or more clips 1100. In the illustrated embodiment of FIG. 9, there are five clips 1100 used to couple the back 912 and top 914 to one another. In other embodiments, one or more clips 1100 may be used.

The clip 1100 may also be used to allow limited movement when it is clamped. For example, in FIG. 10, the clip 1100 is used with the latch 928. The latch 928 may be coupled to the door 920 via one or more clips. In this arrangement, the latch 928 may pivot or slide within the opening 1202.

Turning now to FIGS. 10 and 13-14, the crate assembly 900 may also include one or more side clips 1300. The side clip 1300 may be used in place of the clip 1100. The side clip 1300 may be formed from a single wire 1402 having a first end and a second end spaced from one another by a small gap 1400. The side clip 1300 may include a receiving end 1404, as shown in FIG. 14. The receiving end 1404 may be configured to engage two or more wires from at least two different sides of the crate assembly 900. For example, in FIG. 13, the top 914 may include a perimeter wire 1302 disposed adjacent to a first horizontal wire 1304 of the first side 916. The first side 916 may be formed by a plurality of interconnecting horizontal and vertical wires including the first horizontal wire 1304 and a second horizontal wire 1306.

In the coupled arrangement of FIG. 13, the top 914 and first side 916 may be coupled to one another by using the side clip 1300 to couple the perimeter wire 1302 and first horizontal wire 1304 via the receiving end 1404.

The single wire 1402 of the side clip 1300 may include a plurality of bends which form the shape of the clip 1300. In particular, as shown in FIG. 14, the side clip 1300 may include a first bend 1406 and a second bend 1408 located near the gap 1400. The wire 1402 then includes a pair of elongated portions as shown in FIG. 14. A first elongated portion is defined between the first bend 1406 and a fourth bend 1412, and a second elongated portion is defined between the second bend 1408 and a third bend 1410. The third and fourth bends are located at the receiving end 1404 of the side clip 1300. In addition, a fifth bend 1414, a sixth bend 1416, a seventh bend 1418, and an eighth bend 1420 are located at the receiving end 1404 thereof. A straight portion 1422 may be defined between the seventh bend 1418 and the eighth bend 1420, as shown in FIG. 14.

Figure 15:
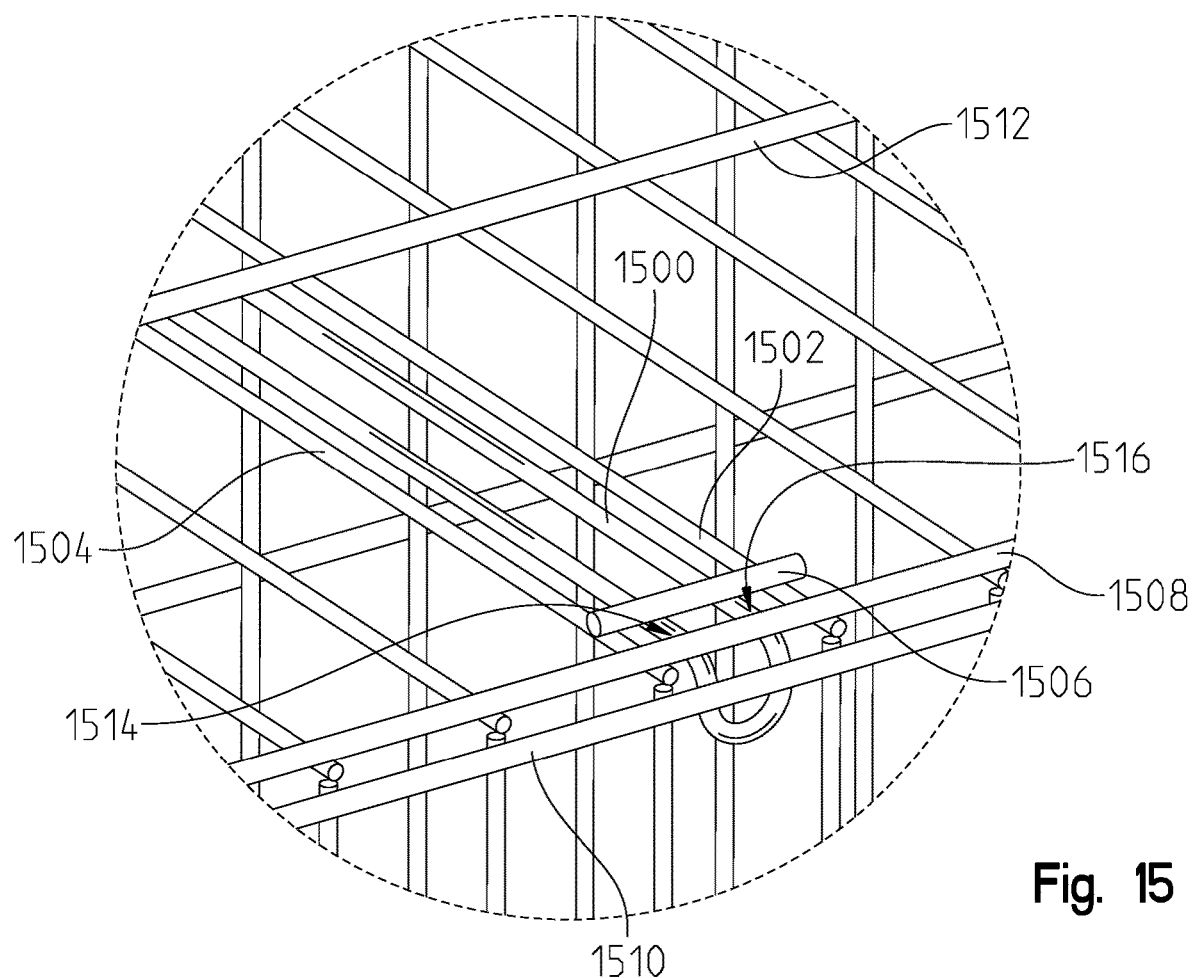
FIG. 15 is an enlarged perspective view of a top panel with a hook member as part of the crate assembly of FIG. 9.
Figure 16:
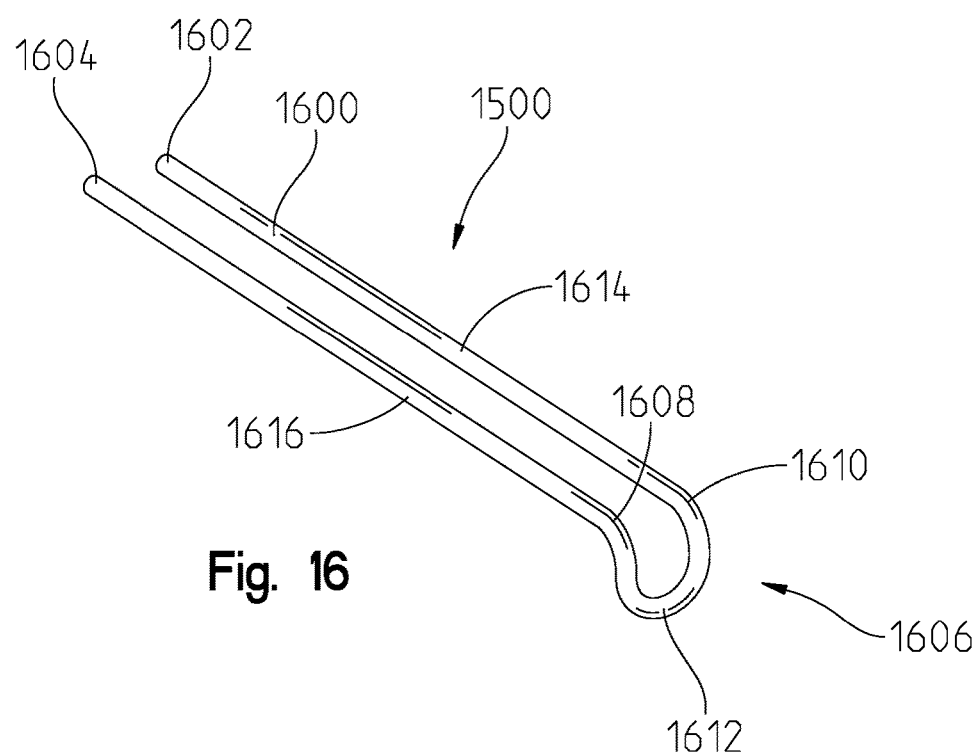
FIG. 16 is a perspective view of the combined clip and hook of FIG. 15.

Referring to FIGS. 9-10 and 15-16, the crate assembly 900 may include a hook member 1500. The hook member 1500 is shown in FIG. 16 where it may be formed by a single wire 1600 having a first end 1602 and a second end 1604. The hook member 1500 may also include a first bend 1608 and a second bend 1610, as illustrated. The hook member 1500 includes a first elongate portion 1614 defined between the first end 1602 and the second bend 1610, and a second elongate portion 1616 defined between the second end 1604 and the first bend 1608. The first and second elongate portions may lie within a first plane. However, the hook member 1500 may also include a hook portion 1606 partially formed by the first and second bends. As shown in FIG. 16, the single wire 1600 forms a substantially U-shaped hook portion 1606 between the first bend 1608 and the second bend 1610, and the hook portion 1606 may be disposed within a second plane. In one example, the first plane and second plane may be perpendicular to one another. In another example, the first and second planes may be angled with respect to one another. As will be described, the hook portion 1606 may form a blocking end 1612.

Referring to FIGS. 9-10 and 15, the hook member 1500 may be coupled to the top 914. In particular, the hook member 1500 may be coupled to a top wire 1512 and a top perimeter wire 1508. The top perimeter wire 1508 may form an outer perimeter of the top 914, and the top perimeter wire 1508 may be located adjacent to a horizontal perimeter wire 1510 of the top door frame 922.

The top 914 may also include a first top wire 1502 and a second top wire 1504. The first and second top wires may be perpendicular to the top wire 1512 and top perimeter wire 1508. Moreover, the hook member 1500 may be located between the first top wire 1502 and the second top wire 1504, as shown. A cross wire 1506 is shown coupled between the first top wire 1502 and the second top wire 1504. The hook member 1500 may also be coupled to the cross wire 1506 to further support the hook member 1500. Thus, the hook member 1500 may be coupled to at least two or more wires of the top 914. Further, the hook member 1500 may be coupled to the top perimeter wire 1508 at or near the first and second bends.

In use, the hook member 1500 is positioned behind the door frame 922, as shown in FIG. 15. In particular, the hook member 1500 may contact the horizontal perimeter wire 1510 in at least two locations. In FIG. 15, the hook member 1500 may engage or contact the horizontal perimeter wire 1510 at a first contact location 1514 and a second contact location 1516. It is noted, however, that the hook member 1500 only contacts the horizontal perimeter wire 1510 and is not affixed or permanently coupled thereto. In this arrangement, the hook member 1500 provides support to the door frame 922 and prevents the door frame 922 from flexing inward, i.e., towards the interior of the crate assembly 900.

Figure 17:
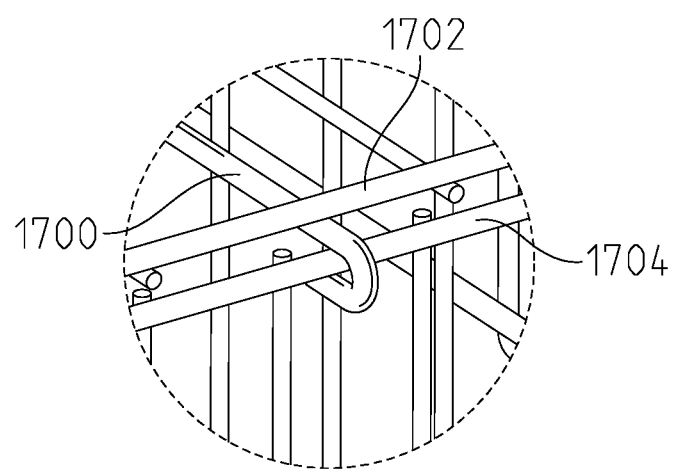
FIG. 17 is an enlarged perspective view of a portion of an elongated hook coupled to the crate assembly of FIG. 9.
Figure 18:
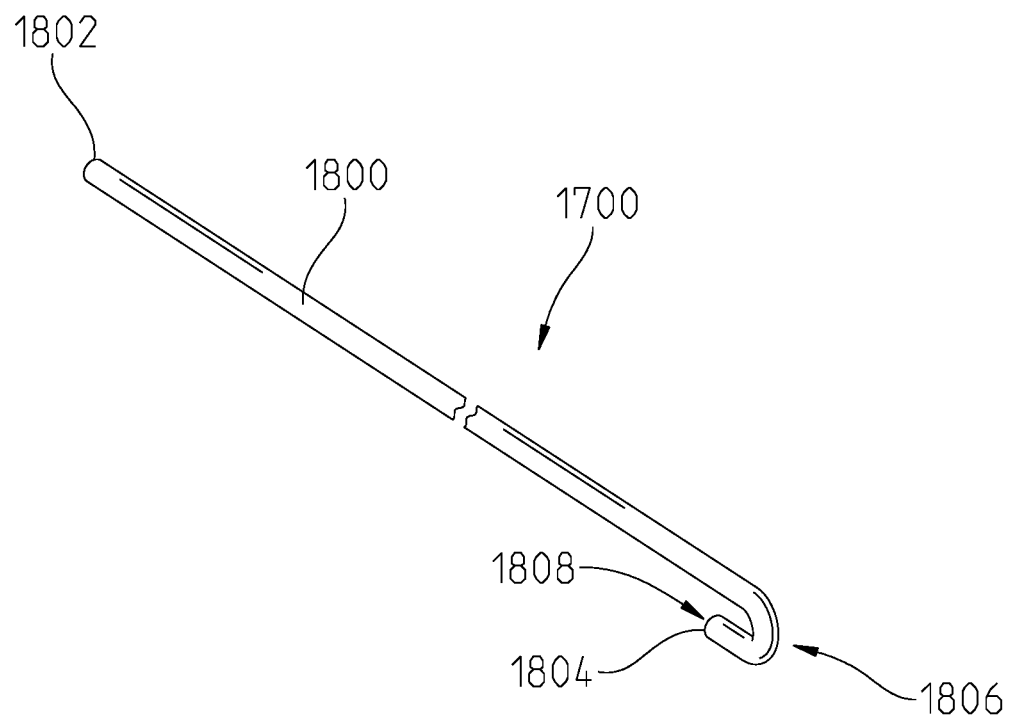
FIG. 18 is a perspective view of the elongated hook of FIG. 17.

Referring to FIGS. 9-10 and 17-18 of the present disclosure, an elongate hook 1700 is shown. Unlike the hook member 1500 of FIG. 15, the elongate hook 1700 is designed to couple the top 914 and door frame 922 to one another. The elongate hook 1700 may be formed of a single wire 1800 having a first end 1802 and a second end 1804. At the second end 1804, the single wire 1800 forms a hook portion 1806. The hook portion 1806 may define an opening 1808 as shown. The opening 1808 is formed because the first end 1802 and second end 1804 may be aligned offset from one another, as shown in FIG. 18.

Turning to FIG. 17, the elongate hook 1700 is able to couple the top and door frame to one another. Specifically, the top 914 may include a perimeter wire 1702 and the door frame 922 may include a perimeter wire 1704. For sake of clarity, the perimeter wire 1702 of the top 914 may be the same as the top perimeter wire 1508 of FIG. 15. Further, the perimeter wire 1704 of the door frame 922 may correspond with the horizontal perimeter wire 1510 of FIG. 15. The hook portion 1806 of the elongate hook 1700 may capture the perimeter wire 1702 of the top 914 and the perimeter wire 1704 of the door frame 922 in the opening 1808 to couple the top 914 and door frame 922 to one another.

While exemplary embodiments incorporating the principles of the present disclosure have been disclosed herein, the present disclosure is not limited to the disclosed embodiments. Instead, this disclosure is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An animal crate assembly, comprising:
   a plurality of members defining an interior of the crate assembly, where the plurality of members includes a front, a back, a top, a bottom, a first side and a second side;
   a door frame formed in one of the plurality of members, the door frame having a plurality of interconnected horizontal and vertical wires that define an opening for an animal to pass therethrough and to enter or exit the interior of the crate assembly;
   a door comprising a plurality of interconnected horizontal and vertical wires and being pivotally coupled to the door frame, the door being pivotable about a pivot wire of the frame to move between an open position and a closed position; and
   a hook member formed from a wire having a first end, a second end, and a hook portion, the hook member being coupled to the top and the hook portion extending partially downward where it intersects a plane in which the top is disposed within;
   wherein, each of the plurality of members is formed by a plurality interconnected horizontal and vertical wires;
   wherein, the top and door frame are coupled to one another;
   further wherein, the hook portion is positioned between a top perimeter wire of the top and a frame perimeter wire of the door frame such that the entire hook member is located within the interior of the crate assembly and behind the door frame.

2. The crate assembly of claim 1, wherein the top comprises a first wire positioned parallel to the top perimeter wire, the hook member being coupled to the first wire and the top perimeter wire.

3. The crate assembly of claim 2, further comprising a cross wire having a length shorter than the first wire and the top perimeter wire but being parallel therewith, the hook member being coupled to the cross wire.

4. The crate assembly of claim 1, wherein the top comprises a first wire and a second wire, the first and second wires being parallel to but offset from one another, where the first and second wires are perpendicular to the top perimeter wire.

5. The crate assembly of claim 4, wherein the hook member is positioned between the first and second wires.

6. The crate assembly of claim 4, wherein a cross wire is coupled to the first wire, the second wire and the hook member.

7. The crate assembly of claim 1, wherein the hook member comprises a first bend and a second bend, where a first portion of the hook member is defined between the first end and the first bend and the second end and the second bend, and the hook portion is defined between the first and second bends.

8. The crate assembly of claim 7, wherein the first portion is defined within a first plane and the hook portion is defined in a second plane.

9. The crate assembly of claim 1, wherein the hook member contacts the frame perimeter wire in at least two locations.

10. The crate assembly of claim 1, further comprising a plurality of elongate hooks for coupling the top and door frame to one another, where each of the plurality of elongate hooks comprises a wire having a first end and a second end, the second end defining a hook opening for receiving the top perimeter wire of the top and the frame perimeter wire of the door frame.

11. The crate assembly of claim 1, further comprising at least one side clip formed by a wire having a first end, a second end, and a receiving end, the receiving end coupling a second top perimeter wire of the top with the first side or the second side.

12. The crate assembly of claim 1, further comprising a clip having a hollow body with a defined opening, the clip coupling one of the plurality of members with another of the plurality of members.

13. A multi-level animal crate assembly, comprising:
a plurality of members defining an interior of the crate assembly, the plurality of members includes a front, a back, a top, a bottom, a first side and a second side, wherein each of the plurality of members comprises a plurality of horizontal and vertical interconnected wires;
an upper level and a lower level formed by the front, the back, the top, the bottom, the first side and the second side, where the upper level is located above the lower level;
a first door frame formed in one of the plurality of members, the first door frame comprising a plurality of interconnected horizontal and vertical wires that define an opening for an animal to pass therethrough and to enter or exit the interior at the upper level of the crate assembly;
a first door comprising a plurality of interconnected horizontal and vertical wires and being pivotally coupled to the first door frame, the first door being pivotable about a pivot wire of the first door frame to move between an open position and a closed position;
a second door frame formed in one of the plurality of members, the second door frame comprising a plurality of interconnected horizontal and vertical wires that define an opening for an animal to pass therethrough and to enter or exit the interior at the lower level of the crate assembly;
a second door comprising a plurality of interconnected horizontal and vertical wires and being pivotally coupled to the second door frame, the second door being pivotable about a pivot wire of the second door frame to move between an open position and a closed position; and
a hook member formed from a wire having a first end, a second end, and a hook portion, the hook member being coupled to the top such that the hook portion extends partially downward where it intersects a plane in which the top is disposed within; a plurality of elongate hooks for coupling the top and door frame to one another, where each of the plurality of elongate hooks comprises a wire having a first end and a second end, the second end defining a hook opening for receiving the top perimeter wire of the top and the frame perimeter wire of the door frame;
wherein, the top and first door frame are coupled to one another, the top including a top perimeter wire and the first door frame including a frame perimeter wire;
further wherein, the hook portion is positioned between the top perimeter wire and the frame perimeter wire such that the hook portion is located at least partially within the interior of the crate assembly and behind the door frame.

14. The crate assembly of claim 13, wherein the top comprises a first wire and a cross wire, the first wire and cross wire being positioned parallel to the top perimeter wire such that the hook member is coupled to the first wire, the cross wire and the top perimeter wire.

15. The crate assembly of claim 14, wherein the cross wire comprises a length shorter than the first wire and the top perimeter wire.

16. The crate assembly of claim 14, wherein:
the top comprises a second wire and a third wire, the second and third wires being parallel to but offset from one another;
the first and second wires are perpendicular to the top perimeter wire, the first wire and the cross wire; and
the hook member is positioned between the first and second wires and parallel thereto.

17. The crate assembly of claim 13, wherein the hook member comprises a first bend and a second bend, where a first portion of the hook member is defined between the first end and the first bend and the second end and the second bend, and the hook portion is defined between the first and second bends.

18. The crate assembly of claim 17, wherein the first portion is defined within a first plane and the hook portion is defined in a second plane, the first plane and second plane being perpendicular to one another.

19. An animal crate assembly, comprising:
a plurality of members defining an interior of the crate assembly, where the plurality of members includes a front, a back, a top, a bottom, a first side and a second side;
a door frame formed in one of the plurality of members, the door frame having a plurality of interconnected horizontal and vertical wires that define an opening for an animal to pass therethrough and to enter or exit the interior of the crate assembly;
a door comprising a plurality of interconnected horizontal and vertical wires and being pivotally coupled to the door frame, the door being pivotable about a pivot wire of the door frame to move between an open position and a closed position;

a hook member formed from a wire having a first end, a second end, and a hook portion, the hook member being coupled to the top and the hook portion extending partially downward where it intersects a plane in which the top is disposed within;

a plurality of elongate hooks for coupling the top and door frame to one another, where each of the plurality of elongate hooks comprises a wire having a first end and a second end, the second end defining a hook opening for receiving the top perimeter wire of the top and the frame perimeter wire of the door frame;

at least one side clip formed by a wire having a first end, a second end, and a receiving end, the receiving end coupling a second top perimeter wire of the top with the first side or the second side; and a clip having a hollow body with a defined opening, the clip coupling one of the plurality of members with another of the plurality of members;

wherein, the hook portion is positioned between a top perimeter wire of the top and a frame perimeter wire of the door frame such that the hook portion is located within the interior of the crate assembly and behind the door frame.

20. The crate assembly of claim 19, wherein:

the hook member comprises a first bend and a second bend, where a first portion of the hook member is defined between the first end and the first bend and the second end and the second bend, and the hook portion is defined between the first and second bends; and the first portion is defined within a first plane and the hook portion is defined in a second plane, the first plane and second plane being perpendicular to one another.

* * * * *